United States Patent
Cili et al.

(10) Patent No.: US 11,665,638 B2
(45) Date of Patent: May 30, 2023

(54) APPLICATION AND SERVICE CONTEXT AWARE CELL SELECTION

(71) Applicant: Apple Inc., Cupertino, CA (US)

(72) Inventors: Gencer Cili, San Jose, CA (US); Rawad Rahme, Munich (DE); Mahak Goindani, Cupertino, CA (US); Nabil Akdim, Munich (DE); Enis Simsar, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/446,123

(22) Filed: Aug. 26, 2021

(65) Prior Publication Data

US 2023/0063998 A1 Mar. 2, 2023

(51) Int. Cl.
H04W 4/00 (2018.01)
H04W 52/02 (2009.01)
H04W 24/10 (2009.01)
H04W 64/00 (2009.01)

(52) U.S. Cl.
CPC ....... H04W 52/0206 (2013.01); H04W 24/10 (2013.01); H04W 64/006 (2013.01)

(58) Field of Classification Search
CPC ............. H04W 52/0206; H04W 24/10; H04W 64/006
See application file for complete search history.

(56) References Cited

U.S. PATENT DOCUMENTS

| | | | |
|---|---|---|---|
| 9,763,047 B1 * | 9/2017 | Chakra | H04W 4/023 |
| 10,313,240 B2 | 6/2019 | Gobriel et al. | |
| 10,333,807 B2 | 6/2019 | Egner et al. | |
| 10,341,853 B2 | 7/2019 | Edge | |
| 10,542,454 B2 | 1/2020 | Jheng et al. | |
| 10,893,434 B2 | 1/2021 | Liu | |
| 2007/0167174 A1 | 7/2007 | Halcrow | |
| 2009/0005041 A1 | 1/2009 | Steinberg | |
| 2010/0184440 A1 | 7/2010 | Mao | |
| 2012/0089906 A1* | 4/2012 | Reeves | G06F 9/45533 715/255 |
| 2013/0095849 A1* | 4/2013 | Pakzad | H04W 64/00 455/456.1 |

(Continued)

FOREIGN PATENT DOCUMENTS

WO    2018125686 A2    7/2018

OTHER PUBLICATIONS

Extended European Search Report for EP Patent Application No. 22190540.9; 14 pages; dated Jan. 23, 2023.

*Primary Examiner* — Chi H Pham
*Assistant Examiner* — Elisabeth Benoit Magloire
(74) *Attorney, Agent, or Firm* — Kowert, Hood, Munyon, Rankin & Goetzel, PC.

(57) ABSTRACT

This disclosure relates to techniques for performing application context aware cell selection in a wireless communication system. A wireless device may determine a current location of the wireless device. The wireless device may determine cells associated with the current location of the wireless device. Application context based metric information may be determined for the cells associated with the current location of the wireless device. The wireless device may determine a cell with which to associate from the cells associated with the current location of the wireless device based at least in part on the application context based metric information.

20 Claims, 12 Drawing Sheets

(56) References Cited

U.S. PATENT DOCUMENTS

| | | | |
|---|---|---|---|
| 2014/0071895 A1 | 3/2014 | Bane | |
| 2015/0103806 A1 | 4/2015 | Kuusilinna | |
| 2016/0295614 A1* | 10/2016 | Lee | H04W 48/18 |
| 2017/0135099 A1* | 5/2017 | Song | H04W 76/25 |
| 2020/0396653 A1* | 12/2020 | Rom | H04W 36/08 |
| 2021/0045054 A1* | 2/2021 | Liu | H04W 48/20 |
| 2021/0144669 A1* | 5/2021 | Edge | H04W 76/15 |
| 2021/0160028 A1* | 5/2021 | Park | H04L 5/0048 |
| 2021/0185535 A1* | 6/2021 | Agarwal | H04W 12/104 |
| 2021/0258866 A1* | 8/2021 | Chou | H04W 48/16 |
| 2021/0321306 A1* | 10/2021 | Bin Redhwan | H04W 36/0058 |
| 2022/0070812 A1* | 3/2022 | Cheng | H04W 48/12 |
| 2022/0104050 A1* | 3/2022 | Liu | H04W 24/10 |
| 2022/0248367 A1* | 8/2022 | Kumar | H04L 5/0007 |
| 2022/0322448 A1* | 10/2022 | Latheef | H04B 7/063 |

\* cited by examiner

| Technology | | KPI | Description | Weight | Derived |
|---|---|---|---|---|---|
| | RAT Type | NR SA vs NR NSA vs LTE | Radio Technology | 100% | |
| Cellular link Quality Rates | Cell Accessibility | Random Access (RACH) Failure # | Quantifies how much each cell is accessible | 50% | Accessibility and Retainability Failure Rates (the lower the vetter) |
| | Cell Retainability | Radio Link Failure # | Quantifies how much each given device can retain its cellular connection with the cell | 25% | |
| | | Cell Addition Failure # | | 25% | |
| | Cell Level Stability | Data link Stall # | Quantifies the cellular link stability | 50% | Stability Failure Rate (the lower the better) |
| | | Device Reset # | | 50% | |
| Cellular link Feature Flags | Power Consumption Configuration | CDRX Enablement | Cell configuration that allows UEs to sleep for power saving purposes | 100% | Power Friendly Flag |
| | Ciphering | Ciphering Enablement | Cell Configuration that allows UEs to have secure and privacy preserving links with the cellular network | 100% | Ciphering Enablement Flag |
| | VoPS | Voice over PS Support flag | Reflects whether the cell is VoPS (VoLTE and/or VoNR) capable or not | 100% | VoPS Enablement Flag |
| | Coexistance | Coex Support | Reflects whether the cell's frequency band is/can be used in a spectrum sharing fashion with other technologies (e.g., UWB or Wi-Fi) | 100% | Coex Flag |
| App/Service Aware Scores | Cell Throughput BW Estimate | DL throughput average | Quantifies the size of the cellular throughput bandwidth of the link | 18% | Throughput BW Quality Score (the higher the better) |
| | | DL throughput 90th percentile | | 9% | |
| | | DL throughput 10th percentile | | 23% | |
| | | UL throughput average | | 18% | |
| | | UL throughput 90th percentile | | 9% | |
| | | UL throughput 10th percentile | | 23% | |
| | Cell Latency Estimate | Latency average | Quantifies how much the cellular link is latency friendly | 44% | Latency Score (the higher the better) |
| | | Latency 90th percentile | | 23% | |
| | | Latency 10th percentile | | 33% | |
| | Voice Call Quality | VoPS Call Drop Rate | Quantifies the quality of the cellular link when it comes to using it to perform voice calls | 55% | Voice Call Quality Score (the higher the better) |
| | | VoPS Call Setup Success Rate | | 45% | |

Note:
-Devices may have to be in connected mode and go through a time and resource consuming measurement and control information reception process to estimate some or all of the illustrated KPIs/flags, such that crowdsourcing from multiple devices may benefit the KPI collection and score/flag/rate derivation process

FIG. 12

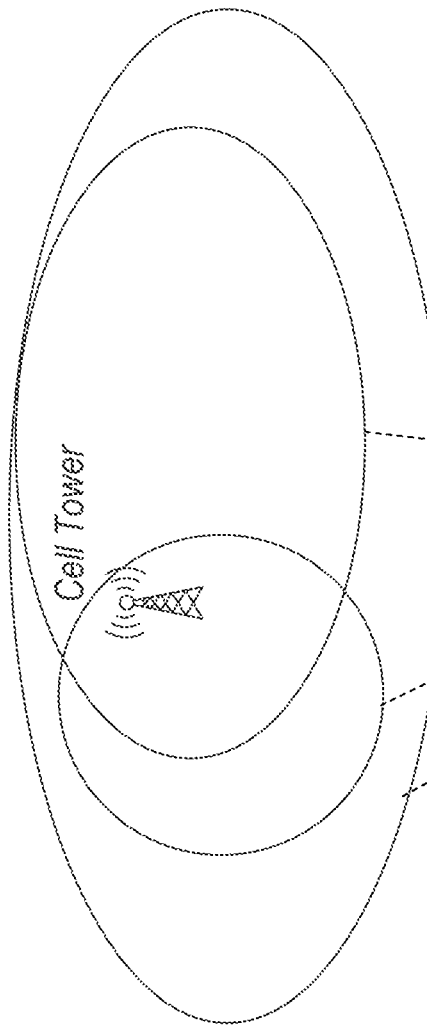

| Network | Cell ID | Lat/Long | RAT | Ciphering | Power Friendly | VoPS Flag | Coex Flag | RSRP/SINR Region | Accessibility and Retainability Failure Rate | Stability Failure Rate | T-put BW Score | Latency Score | Voice Quality Score |
|---|---|---|---|---|---|---|---|---|---|---|---|---|---|
| Network A | Cell B | 48.13 / 11.57 | NR5G NSA | TRUE | TRUE | TRUE | FALSE | Good | 0.00 | 0.00 | 78% | 97% | 100% |
| | | | | | | | | Moderate | 1.5 | 0.7 | 69% | 97% | 100% |
| | | | | | | | | Bad | 5 | 3 | 54% | 97% | 97% |

Notes:
- Scores and rates can vary with the RSRP/SINR regions (these may be referred to as per cell heat-maps), even within the same cell. These can be calculated offline using crowdsourced data
- The RSRP/SINR region boundaries shown are for illustrative purpose; they can change very dynamically, and can depend on device velocity, cell instantaneous load, etc. In a multi-cell scenario, to pick a cell to associate to, a device may measure the instantaneous actual RSRP/SINR values per cell, compare those to the per cell region thresholds (derived from crowdsourced data), and decide accordingly

FIG. 13

APPLICATION AND SERVICE CONTEXT AWARE CELL SELECTION

FIELD

The present application relates to wireless communications, and more particularly to systems, apparatuses, and methods for performing application and service context aware cell selection in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for performing application and service context aware cell selection in a wireless communication system.

According to the techniques described herein, a wireless device may obtain cell performance information for various application context based metrics and/or various other possible metrics for cells in the vicinity of the wireless device. The cell performance information may be based on historical performance information between the wireless device and those cells, and/or may be based on crowdsourced aggregated data, among various possibilities. In some instances, the cell performance information for a cell may depend on the cell signal strength and/or quality measured by the wireless device. The wireless device may also obtain information regarding other cell characteristics, potentially including information regarding certain cell configuration settings, which may also be based at least in part on historical performance information (e.g., from the wireless device's direct experience and/or based on crowdsourced aggregated data).

Based on this cell information for the cells in the vicinity of the wireless device, and the current application, service, and/or device context characteristics of the wireless device, the wireless device may select a cell with which to associate. This may include selecting a cell that meets any configured device context based criteria, with priority and/or bias in the cell selection towards cells with better scores, rates, or other indicators in application context based metrics prioritized by the current application and/or service context of the wireless device.

Performing cell selection in such a manner may increase the likelihood that the cell selected will provide suitable and potentially the best available service for the specific application and device context of the wireless device at any given time, at least according to some embodiments.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 12 is a table illustrating various possible cell characteristics that can be used in an application and service context aware cell selection process, according to some embodiments;

FIG. 13 illustrates exemplary aspects of a possible set of cell information for the cell characteristics illustrated in FIG. 12, including at least some different values for different RSRP/SINR regions, that can be used in an application and service context aware cell selection process, according to some embodiments.

Figure 1:
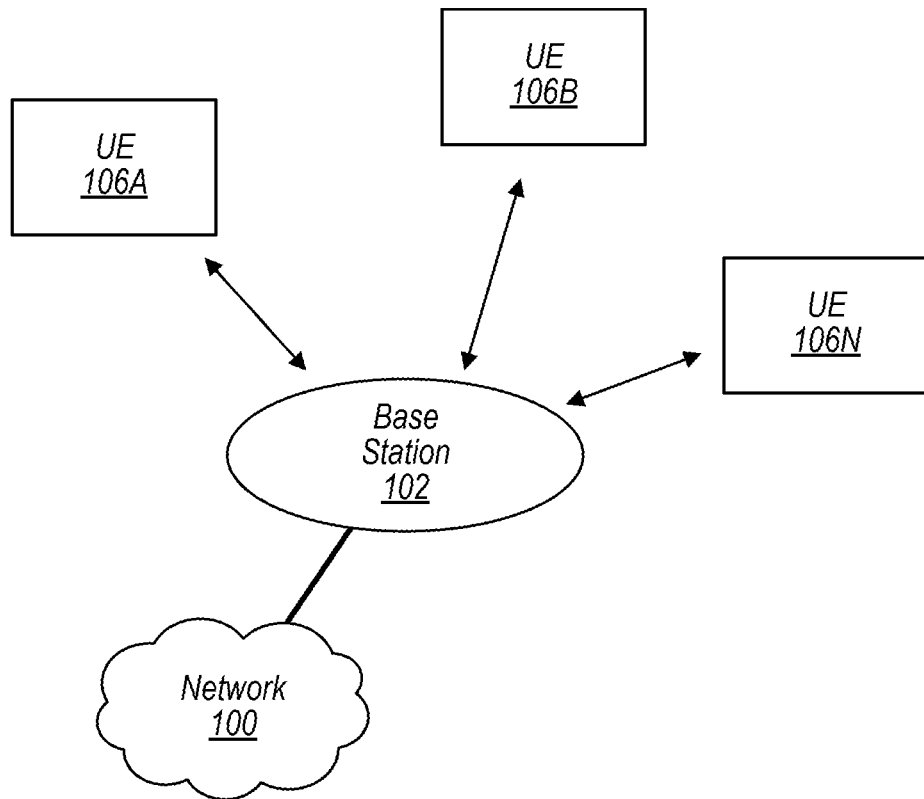
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
RSRP: Reference Signal Received Power
RSRQ: Reference Signal Received Quality
SINR: Signal to Interference plus Noise Ratio
RRC: Radio Resource Control
QoS: Quality of Service Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)— The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
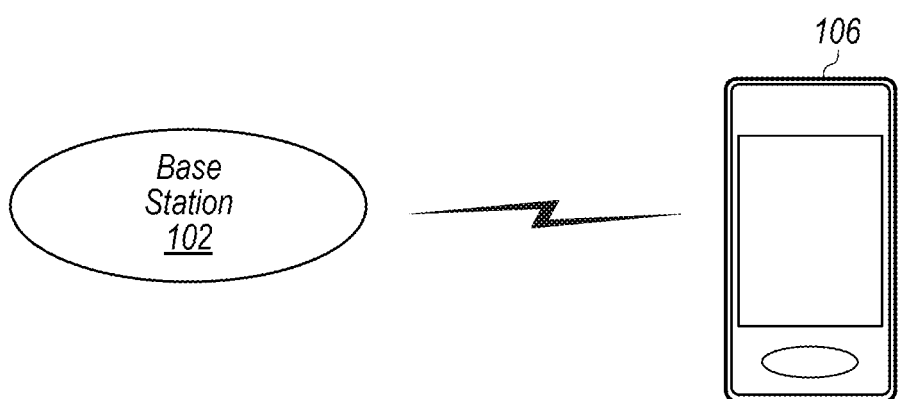
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for performing application and service context aware cell selection in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
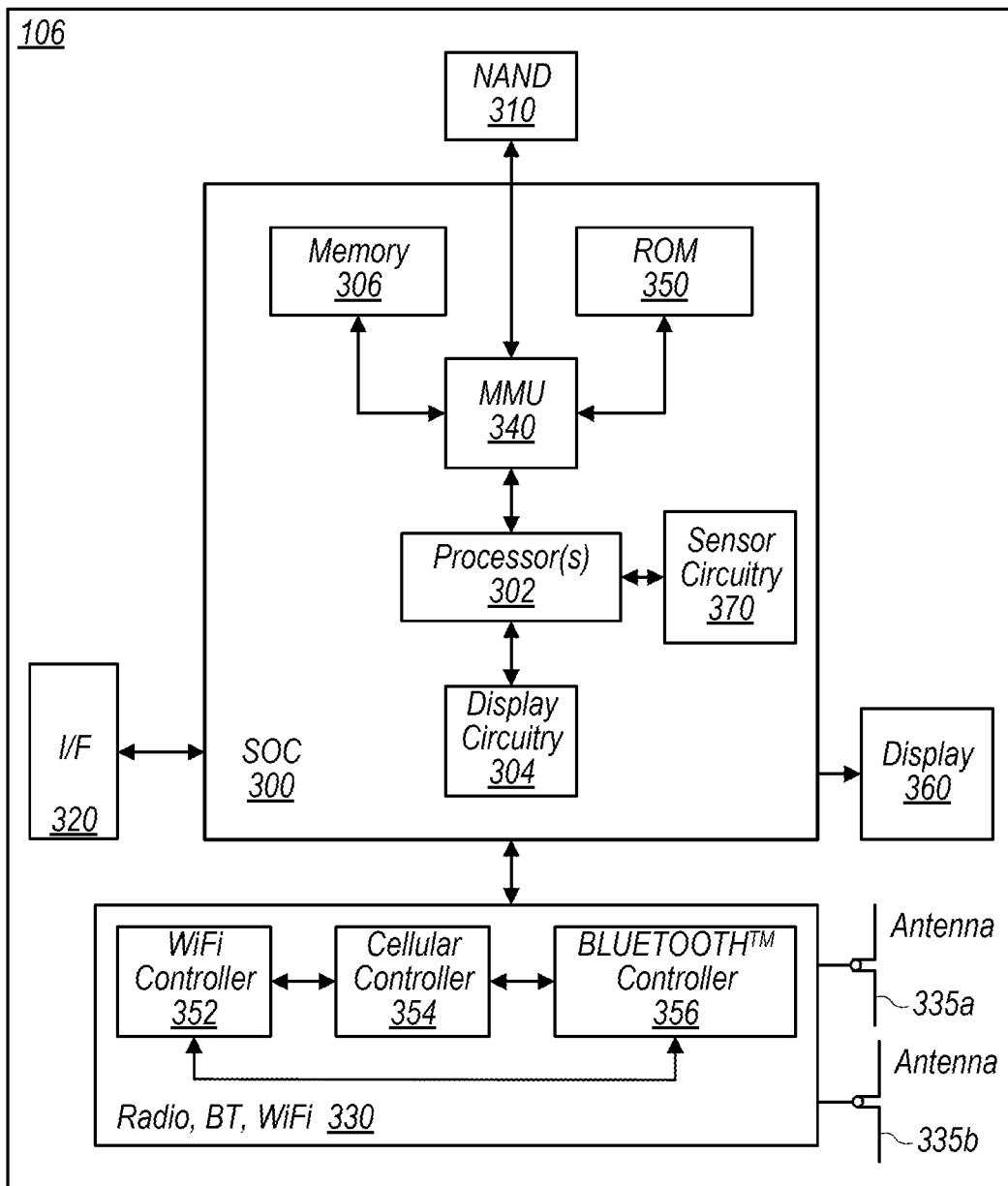
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for application and service context aware cell selection in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for application and service context aware cell selection in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
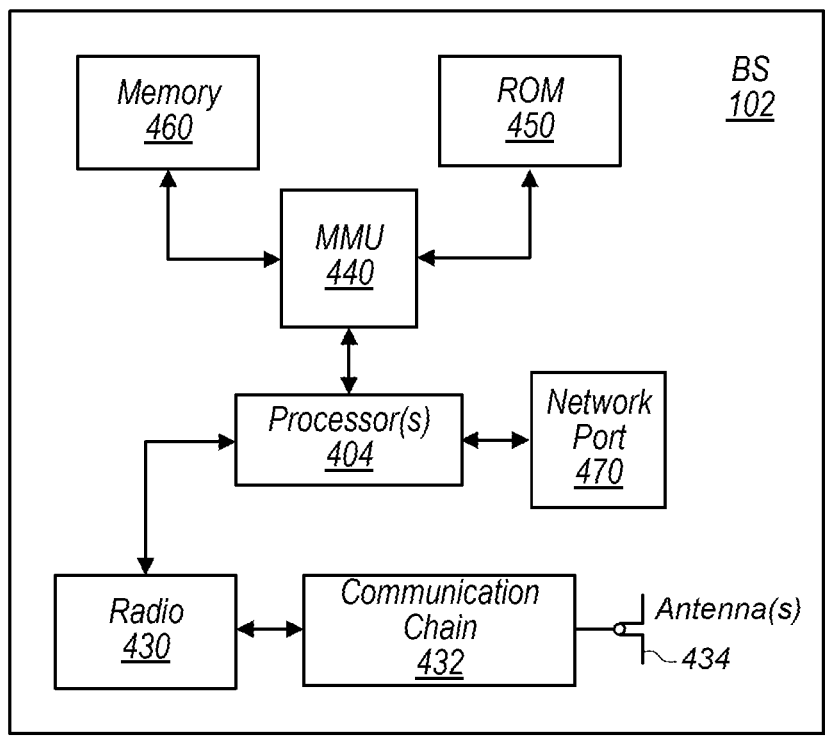
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
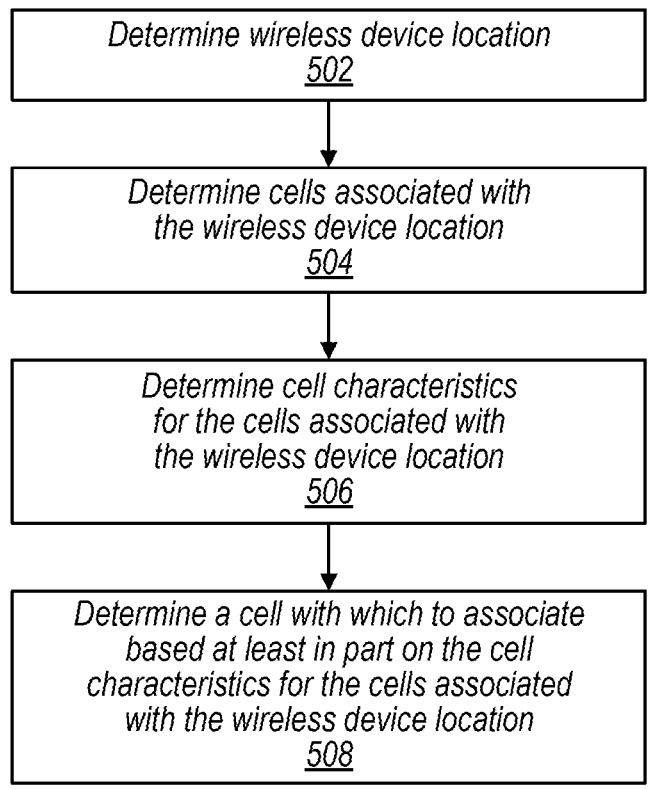
FIG. 5 is a flowchart diagram illustrating aspects of an exemplary possible method for performing application and service context aware cell selection in a wireless communication system, according to some embodiments.

FIG. 5—Application and Service Context Aware Cell Selection

Cell selection and re-selection may commonly be performed in a user context agnostic manner. For example, in at least some cellular communication systems, network configured thresholds may be used in conjunction with various cell measurements to control how and when cell selection and re-selection is performed. However, as network deployments become more dense and diverse (e.g., including cells of different sizes and/or that are intended to cater to different types of service preferences, among various possibilities), there may be an increasing opportunity for user experience to be improved by introducing application, service, and/or wireless device context awareness when performing cell selection and cell re-selection. For example, such techniques may have the potential to improve the Quality of Service (QoS) experienced for the specific application(s) or service(s) active at the wireless device, by increasing the likelihood that the cell with which a wireless device associates can provide the best performance for the specific needs or preferences of the specific application(s) or service(s) active at the wireless device at that particular time.

Thus, it may be beneficial to specify techniques for supporting application and service context aware cell selection. To illustrate one such set of possible techniques, FIG. 5 is a flowchart diagram illustrating a method for performing application and service context aware cell selection in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may determine a current location of the wireless device. The current location may be determined using any of a variety of techniques, for example including use of one or more global navigational satellite systems (e.g., GPS, GLONASS, etc.) to determine a latitude and longitude coordinate set for the wireless device. Additionally, or alternatively, the location determination could be based at least in part on communication between the wireless device and one or more cellular base stations, for example using cell identification information for the cellular base station(s) and stored information indicating coordinates associated with the cell identification information. Other techniques are also possible.

In 504, the wireless device may determine one or more cells associated with the current location of the wireless device. At least according to some embodiments, the wireless device may store information identifying cells associated with various locations. For example, the location information for the cells may include cell centroid coordinates and cell radius information, which may allow the wireless device to determine whether a given set of coordinates may be within the typical or possible communication range of the cell. Other formats for associating cells with locations are also possible. Using such information, the wireless device may determine a set of cells whose locations are in the vicinity of the current location of the wireless device, for example such that those cells may be considered as potential cells to associate with by the wireless device.

In 506, the wireless device may determine cell characteristics for the cells associated with the current location of the wireless device. The cell characteristics may include any of a variety of cell characteristics. Some of the cell characteristics may relate to the configuration parameters of the cell. For example, the cell characteristics could include indicators for whether a cell has enabled cell ciphering, whether connected discontinuous reception (CDRX) is enabled at a cell (and/or indicating the status of one or more other power consumption related configuration parameters), or whether the cell supports voice over packet switched (VoPS) communication. The cell characteristics could additionally or alternatively include any of various fundamental characteristics of a cell, such as a frequency on which the cell is deployed, a RAT of the cell, a network (e.g., PLMN) associated with the cell, etc.

In at least some embodiments, the cell characteristics may include one or more performance related cell characteristics, which may be determined based on measured historical performance. For example, the cell characteristics could include a cell accessibility metric (e.g., which may be based on how often attempts to access a cell fail according to the historical performance information, as one possibility), a cell retainability metric (e.g., which may be based on how often an established radio link with a cell fails and/or how often additional cell addition (e.g., through carrier aggregation (CA), or dual connectivity (DC)) fails according to the historical performance information, as one possibility), and/or a cell stability metric (e.g., which may be based on how often data link stalls and/or device resets occur for a cell according to the historical performance information, as one possibility), among various possibilities.

The cell characteristics could include one or more application context based metrics for a cell, at least according to some embodiments. For example, the cell characteristics could include a cell throughput score metric (e.g., which may be particularly relevant for application contexts in which high throughput is particularly important), a cell latency score metric (e.g., which may be particularly relevant for application contexts in which low latency is particularly important), and/or a cell voice call quality score metric (e.g., which may be particularly relevant for application contexts in which voice call quality is particularly important). A cell's scores for such metrics may be based on historical performance information for the cell. For example, the cell throughput score metric may be based on a combination some or all of average downlink throughput, average uplink throughput, high percentile uplink and/or downlink throughput values (e.g., 90%), or low percentile uplink and/or downlink throughput values (e.g., 10%). Similarly, the cell latency score metric may be based on a combination some or all of average latency, a high percentile latency value (e.g., 90%), or a low percentile latency value (e.g., 10%). The voice call quality score may be based on a voice call setup success rate and/or a voice call drop rate. Note that other application context based scores/metrics are also possible, and/or that the application context based scores/metrics described herein may be determined in other ways, according to various embodiments.

Some or all of the cell characteristics for the cells associated with the current location of the wireless device may be determined based at least in part on aggregated crowdsourced data. For example, it may be possible that multiple wireless devices measure and store and/or report historical performance information that can be used to calculate some or all of the cell characteristics. Such information may be reported to an aggregating entity (e.g., a server or group of servers, as one possibility) that determines cell characteristics for cells based on the aggregated crowdsourced historical performance information reported to the aggregating entity. The determined cell characteristics may be provided from the aggregating entity (e.g., possibly by way of one or more intermediate steps) to the wireless device, and may in turn be used by the wireless device in accordance with the method of FIG. 5 and/or for any of various other possible purposes.

Additionally, or alternatively, some or all of the cell characteristics for the cells associated with the current location of the wireless device may be determined based at least in part on historical cell performance between the wireless device and those cells. For example, it may be possible that the wireless device measures and stores historical performance information that can be used (e.g., using on-device learning) to calculate some or all of the cell characteristics, and/or to modify cell characteristic information determined based on crowdsourced aggregated data to more closely match the experienced performance of a cell for the wireless device in particular.

At least in some embodiments, some or all of the cell characteristics for the cells associated with the current location of the wireless device may be determined based at least in part on signal strength and/or quality measurements for the one cells associated with the current location of the wireless device. For example, in some instances, multiple cell signal strength/quality regions (e.g., with different signal strength thresholds differentiating the regions) may be defined for at least some cells, which may have different associated values for some or all of the cell characteristics for those cells. Thus, for each cell in the vicinity of the wireless device, the signal strength/quality of the cell may inform in which signal strength/quality region the cell is for the wireless device, and correspondingly the cell characteristics for the cell associated with that signal strength/quality region may be determined as the applicable cell characteristics for the cell.

In 508, the wireless device may determine a cell with which to associate based at least in part on the determined cell characteristics for the cells associated with the current location of the wireless device. The determination of the cell with which to associate may be performed in response to receiving a service request from an application executing on the wireless device, at least in some embodiments. For example, the wireless device may determine to establish a radio resource control (RRC) connection with a cellular base station in order to support a data link with a cellular network to communicate data on behalf of the application that triggered the service request, and may select the cell with which to associate in order to establish the RRC connection on the selected cell, at least according to some embodiments.

Alternatively, it may also be possible that the determination of the cell with which to associate is an initial cell selection while in idle mode, or a cell re-selection (e.g., due to wireless device mobility, or for any of a variety of other possible reasons).

For a scenario in which the cell association is triggered by an application service request, it may be the case that the wireless device determines an application type, or a service type, or otherwise determines application context information for the service request. The application context information may be used to determine which cell characteristic(s) to prioritize when selecting the cell with which to associate. For example, the wireless device may determine whether to prioritize one of throughput, latency, or voice call quality, and/or another characteristic, for the cellular link that will serve the application service request. As another possibility, the wireless device may determine prioritization weights for each application context based metric and/or one or more other cell characteristics based on the nature of the application service request (e.g., as in the soft assignment case in FIG. 14). The determined application context information may be used when selection cell with which to associate. For example, if a neighbor cell has a higher score (possibly by at least a configured threshold) in the application context based metric that the wireless device has determined to prioritize than a current serving cell (and otherwise meets one or more criteria for potential association), the wireless device may determine to re-select to that neighbor cell (noting that the UE's cell neighborhood list may be determined solely by the UE itself, e.g., as described with respect to step 504, at least according to some embodiments), e.g., in order to establish the RRC connection on the cell that is expected to provide better performance for the cell characteristic(s) considered most relevant to the current application/service context of the wireless device, which may in turn result in actual better performance for the application that triggered the application service request than if the RRC connection were established on the serving cell without performing cell re-selection.

In some instances, the cell selection may additionally or alternatively be performed based at least in part on wireless device context information. For example, certain cells may be filtered out from potentially being selected for association based on not meeting certain wireless device context specific criteria. As one such possibility, depending on a battery/power context of the device (e.g., whether the wireless device is currently charging, a current battery reserve level of the wireless device, a current power consumption mode of the wireless device, a current battery drain rate of the wireless device, etc.), certain cells may (or may not) be filtered out based on one or more power consumption related cell characteristics (e.g., whether they have CDRX enabled or not). As another such possibility, depending on a privacy context for the wireless device (e.g., based on a user configured privacy preference setting or any of various other considerations), certain cells may (or may not) be filtered out based on one or more privacy related cell characteristics (e.g., whether ciphering is enabled). Other aspects of wireless device context and corresponding filtering mechanisms are also possible.

Associating with the selected cell by the wireless device may include establishing a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. For example, when the cell association is performed based on an application service request, the wireless device may establish a RRC connection to support the application service request. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, changing application, service, or wireless device context, and/or for any of various other possible reasons.

Thus, at least according to some embodiments, the method of FIG. 5 may be used to perform application and service context aware cell selection. As described herein, such techniques may result in selection of a cell that can better meet the QoS preferences or needs of any active applications or services than application and service context agnostic cell selection techniques, at least in some instances.

FIGS. 6-14 and Additional Information

FIGS. 6-14 illustrate further aspects that might be used in conjunction with the method of FIG. 5 if desired. It should be noted, however, that the exemplary details illustrated in and described with respect to FIGS. 6-14 are not intended to be limiting to the disclosure as a whole: numerous variations and alternatives to the details provided herein below are possible and should be considered within the scope of the disclosure.

Cell selection and re-selection in at least some cellular communication systems may be performed based primarily on radio frequency (RF) measurements in combination with certain network configured thresholds. For example, RF signal strength and/or signal quality thresholds, and/or any of various other possible parameters or thresholds, may be configured by a network to dictate how often a wireless device attached to the network is expected to perform neighbor cell measurements, when to perform cell re-selection, to which cell to re-select, and/or any of various other possible cell re-selection related decisions.

With the increasing proliferation of mobile devices and the popularity of interactive applications, including in indoor and hotspot type areas such as offices, stadiums, shopping malls, subways, etc., cellular traffic is becoming increasingly extensive. To accommodate such traffic increases, one approach being used by cellular network operators (carriers) may include network densification, for example in 5G and beyond cellular network deployments, to boost network capacity. Such densification may be achieved using a hybrid amalgam of a variety of cell types (e.g., microcells, picocells, femtocells, relay nodes, remote radio heads (RRHs), etc.), which may have lower power and cost, and smaller coverage areas than macro cells. In some instances, such cells may typically include millimeter wave (mmWave) cells. Another possible aspect of such a network densification approach to accommodating increasing cellular traffic may include providing cells that offer different service quality guarantees. For example, some such cells may be configured to serve users that are running applications that are throughput hungry (e.g., beamforming enabled mmWave or Wi-Fi hotspots, for example), other such cells may be configured to serve users that are running applications that require low latency, while still other cells may be designed to cater to other use cases, according to various embodiments.

Devising a lightweight device-to-cell association process, which maintains the required end user Quality of Service (QoS), taking into account the user's privacy and mobility needs, and which has a low control overhead, may be a particular challenge in such a highly dense and dynamic environment. For example, dense networks, both in terms of base stations and active users, may mean that UEs, depending on their geo-location, and cellular neighborhood topology and type (e.g., pico, micro, etc.), may perceive highly dynamic cellular links (e.g., due to interference and/or reduced cell size) as well as fluctuating QoS (e.g., due to cell load, cell configuration, cell capabilities, etc.). This may mean that the cell selection process can have a significant impact on achievable QoS.

Accordingly, it may be possible to improve on existing 3GPP defined device-to-cell association mechanisms, such as the approach previously described herein using RF measurements in combination with network configured thresholds. Since such techniques may be network controlled and user-QoS-blind, they may be common for any user that needs to connect to the network (e.g., as they may depend mainly or solely on UE received cell power and interference conditions (e.g., RSRP and SINR), regardless of the UE location, application level QoS, and privacy needs. Network side UE context aware (e.g., based on application needs and/or user geo-location, among various possibilities) cell association and scheduling may not be possible and/or preferable in at least some instances in view of privacy limitations (e.g., mobile devices may choose not to or may not be allowed to share such privacy sensitive information with the network). Accordingly, as one possible alternative, a UE based approach to cell selection/re-selection that considers device and application context information be used.

At least according to some embodiments, such an approach may make use of historical cell performance measurements (e.g., which could include historical results from operation of the wireless device itself, and/or aggregated crowdsourced data from multiple (e.g., other) wireless devices). Such cell and/or location performance information may be used to identify which of any available cells at the location of a UE is expected to provide the best performance for the UE in view of its current application and device context. At least in some instances, certain cell characteristics (which may differ based on a cell's instantaneous load, the type of users and traffic the cell is intended to serve, and/or other considerations) may also be considered in the cell selection/re-selection process, such as whether a cell has cellular ciphering enabled (e.g., which may impact cell selection depending on privacy context for the UE), how power friendly a cell configuration is (e.g., which may impact cell selection depending on battery/power context for the UE), whether a cell operates in a spectrum portion that may be subject to coexistence considerations (e.g., which may impact cell selection depending on coexistence context for the UE) with other wireless communication technologies, and/or any of various other possible cell characteristics.

In some embodiments, one or more scores, rates, and/or flags may be assigned to a cell, possibly per RSRP/SINR region (e.g., of a configured set of RSRP/SINR regions), as part of such an approach to performing cell selection or re-selection. These scores/rates/flags may be designed to reflect the device's contextual awareness about the cells that are in the vicinity of its location. The per-cell+RSRP/SINR region information may be designed to reflect the cellular link quality and performance in multiple aspects.

According to some embodiments, application/service aware scores could include a cell uplink (UL)/downlink (DL) throughput score, a cell latency score, and/or a cell voice call quality score. The cell UL/DL throughput score may reflect how good a cell is at providing UL, DL, or concurrent UL/DL, to a throughput hungry application or service. The cell latency score may reflect how good a cell is at providing low latency to a low latency hungry application or service. The cell voice call quality score may reflect how good a cell is at supporting high fidelity voice calls.

According to some embodiments, cellular link quality rates could include a cell accessibility rate, a cell retainability rate, and/or a cell stability rate. The cell accessibility rate may reflect whether a cell can be accessed easily and reliably. The cell retainability rate may reflect whether a cellular link can be reliably retained, once the UE is associated with the cell, for the needed duration of the connection. The cell stability rate may reflect the stability of a cellular link (e.g., how likely it would be for a UE connected to that cell to reset or stall).

According to some embodiments, cellular link feature flags could include a cell power saving configuration flag, a cell ciphering configuration flag, a cell voice over packet switched (VoPS) flag, and/or a cell coexistence flag. The cell power saving configuration flag may reflect whether a cell's configuration is power consumption friendly or not (e.g., whether connected mode discontinuous reception (CDRX) is enabled, as one possible aspect). The cell ciphering configuration flag may reflect whether a cell has ciphering enabled (e.g., for privacy purposes). The cell VoPS flag may reflect whether a cell is VoPS (e.g., VoLTE and/or VoNR) capable. The cell coexistence flag may reflect whether a cell's frequency band is or can be used in a spectrum sharing fashion with other technologies (e.g., UWB, Wi-Fi, etc.). Note that such information may be valuable to UE baseband operation, for example to support properly instantiating the needed software and hardware resources upfront and in a timely manner, to cope with the inference and/or link drop issues that could potentially result from such coexistence.

The scores/rates/flags for a cell may be determined based at least in part on aggregated crowdsourced data, according to some embodiments. For example, key performance indicator (KPI) information, configuration statistics, and/or other information for any number of cells interacted with by wireless devices may be collected (with the consent of all applicable parties), aggregated, and used to determine the scores/rates/flags for any cells for which such information can be collected. Such information may, for example, be collected from consenting wireless devices associated with a particular wireless device vendor by one or more servers configured for such a purpose and used to determine the scores/rates/flags; some or all such scores/rates/flags may in turn be provided to wireless devices associated with that wireless device vendor (e.g., including at least a subset applicable to the current location of each such wireless device), for example for use when performing application/service context aware cell selection or re-selection. Additionally, or alternatively, the scores/rates/flags for a cell may be determined using on device historical measurements. As one such possibility, a local on-device database may collect historical measurements for cells visited by the wireless device, and determine QoS perception per application type. For example, throughput observed on a certain cell could be used at least in part to determine applicability of that cell for use for streaming applications, as one possibility.

Figure 6:
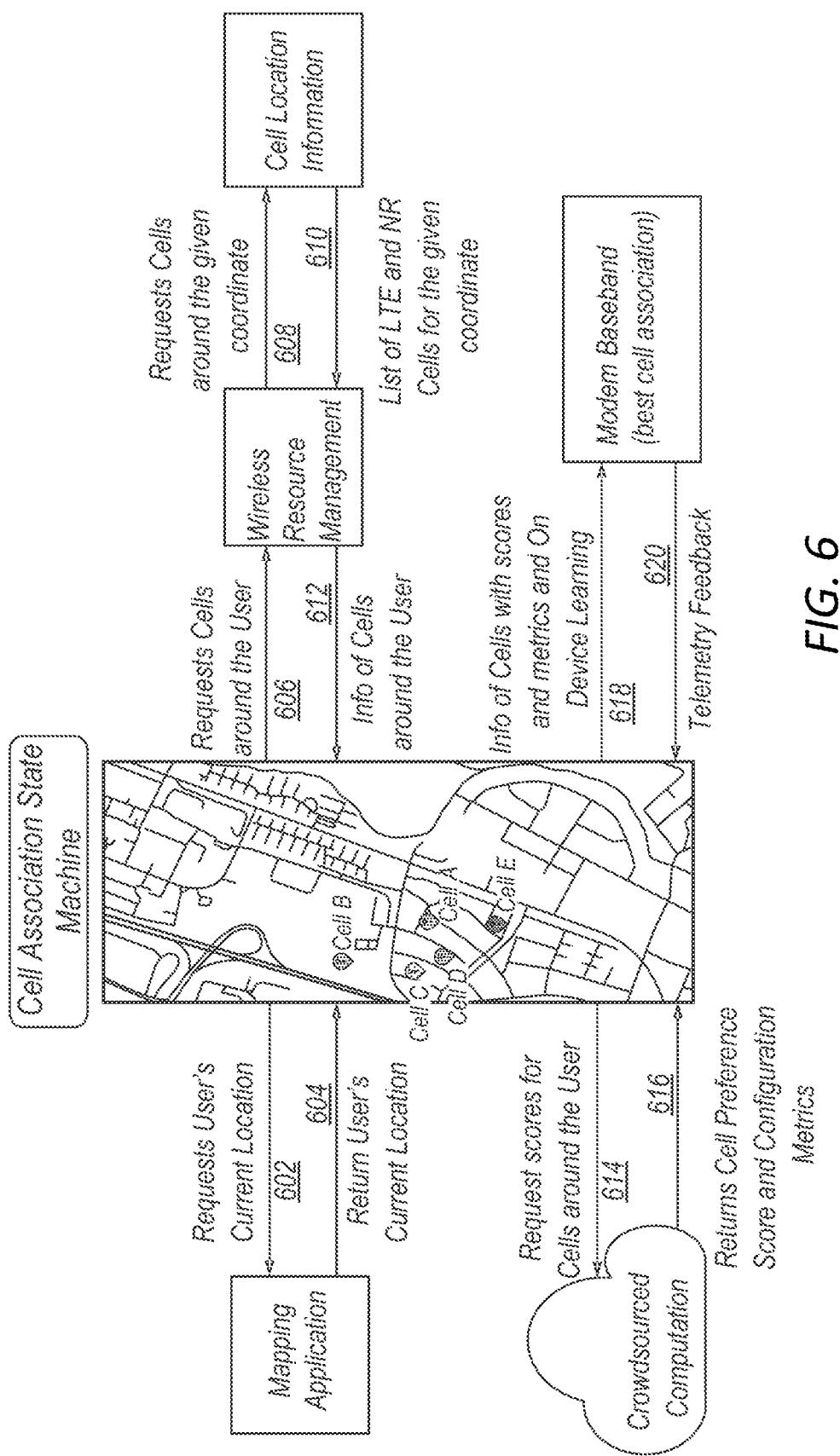
FIG. 6 illustrates aspects of an exemplary possible framework for performing application and service context aware cell selection in a wireless communication system, according to some embodiments.

FIG. 6 illustrates aspects of an exemplary possible framework for performing application and service context aware cell selection in a wireless communication system, according to some embodiments. In the illustrated scenario, in 602, a cell association state machine executing on a wireless device may request information indicating the current location of the wireless device from a mapping application executing on the wireless device. In 604, the mapping application may return the current location information to the cell association state machine. The mapping application may obtain the current location information for the wireless device based at least in part using global navigational satellite system (GNSS) communication, among various possible techniques for determining the current location of the wireless device.

In 606, the cell association state machine may request information regarding cells in the vicinity of the wireless device from a wireless resource management application (e.g., an application programming interface (API)) executing on the wireless device, e.g., by providing coordinate information for the wireless device. In 608, the wireless resource management application may in turn request information indicating cells in the vicinity of the current location of the wireless device from a source of stored cell location information for the wireless device, such as a cell location service API. In 610, a list of LTE and NR cells for the current location of the wireless device may be provided to the wireless resource management entity, which may, in 612, provide the requested information regarding cells in the vicinity of the wireless device to the cell association state machine.

In 614, the cell association state machine may request application/service/configuration information (e.g., scores/rates/flags) for the cells around the wireless device from an entity storing such cell information. The cell information may be computed at least in part using crowdsourced telemetry feedback information aggregated from multiple wireless device, e.g., by a centralized server, and may be provided to the entity storing the cell information on the wireless device, which may, in 616, return cell preference score and configuration metric information for the cells around the wireless device. In 618, the cell information, including any scores/metrics obtained from the crowdsourced computation, possibly additionally with on-device learning based adjustments and/or additions from historical cell performance results experienced by the wireless device itself, may be provided to modem baseband of the wireless device. The modem baseband may use this information to select a best cell with which to associate, for example based on the current application/service/device context for the wireless device. In 620, the modem baseband may also provide telemetry feedback to the cell association state machine. The telemetry feedback may relate to historical cell performance results experienced by the wireless device, which may be provided to the entity performing the crowdsourced computation of cell performance/configuration information, and/or used by the wireless device itself for on-device learning.

Figure 7:
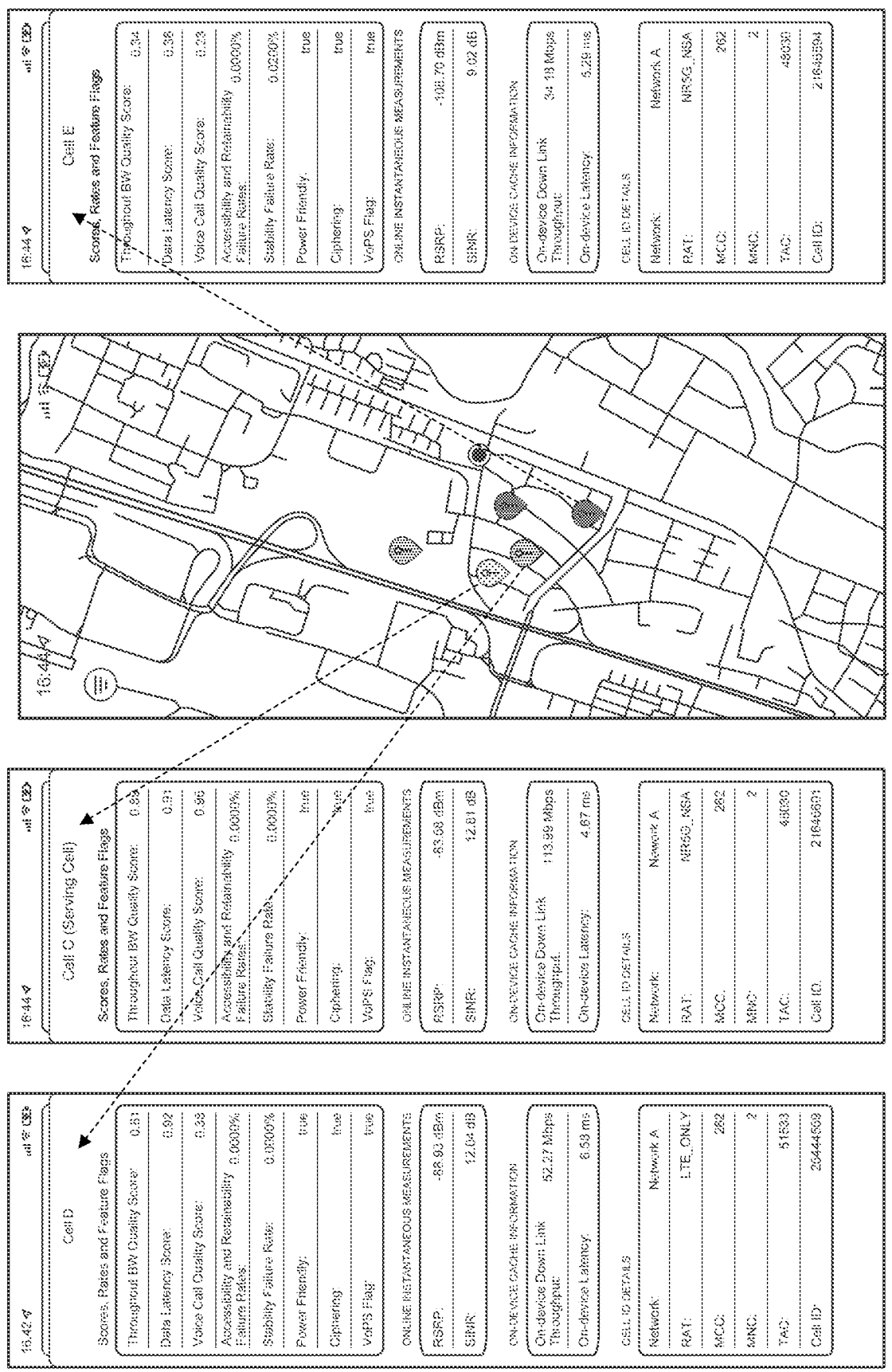
FIG. 7 illustrates exemplary possible cell information for cells under consideration for cell selection in an application and service context aware cell selection process, according to some embodiments.

FIG. 7 illustrates exemplary possible cell information for cells under consideration for cell selection in an application and service context aware cell selection process such as the approach illustrated in and described with respect to FIG. 6, according to some embodiments. As shown, in the illustrated scenario, various scores, rates, and flags for each of various cells in the vicinity of a wireless device may be available to the wireless device to facilitate cell selection. Such detailed cell information may be used to determine a cell preference for a cell with which to associate, which may be biased or weighted to certain scores/rates/flags depending on the application/service/device context for the wireless device. Alternatively, such detailed cell information may be used to determine a cell preference for a cell with which to associate in a wireless device context free manner, e.g., if desired.

Figures 8A, 8B:
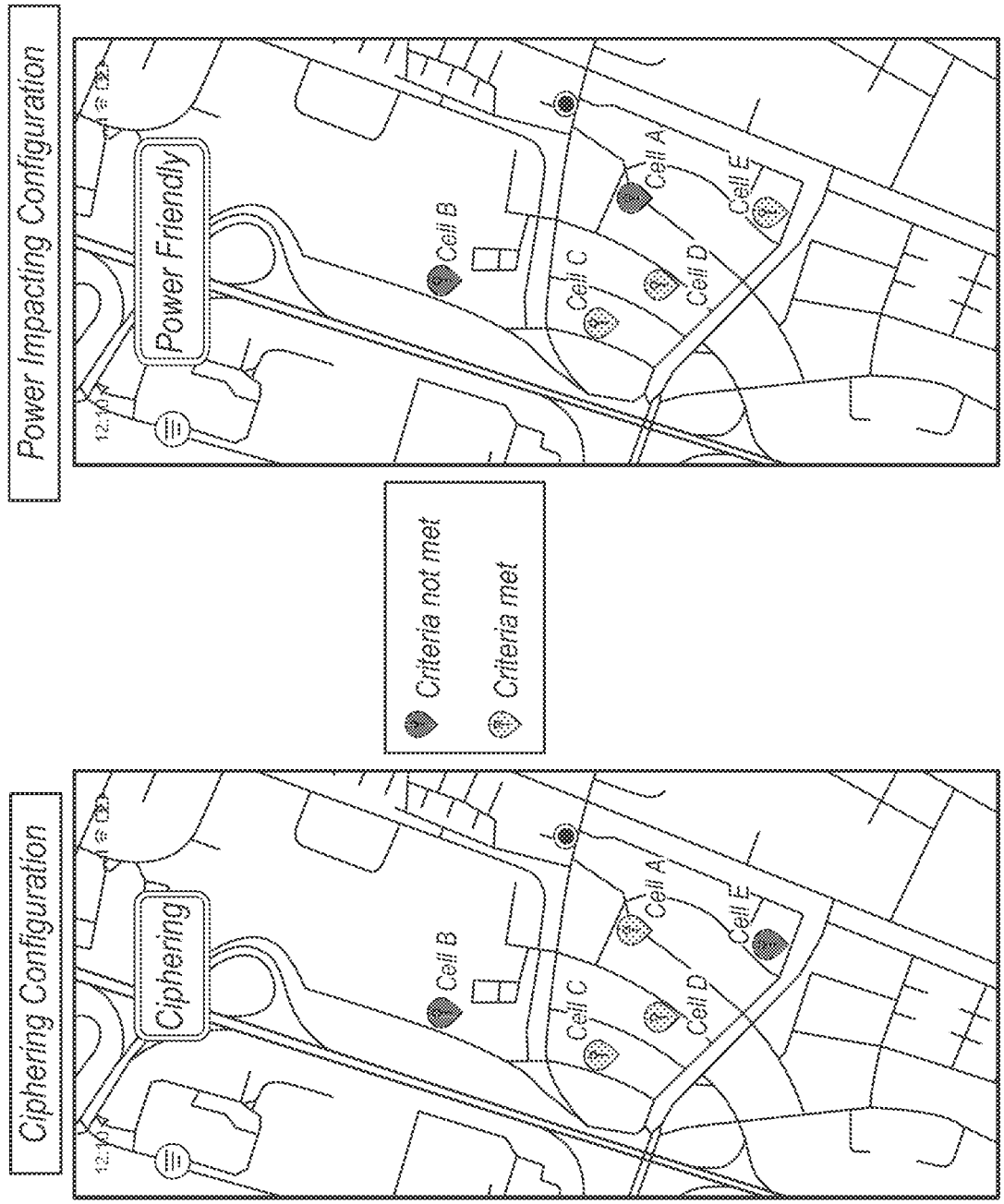
FIGS. 8A-8B illustrate exemplary aspects of possible cell filtering techniques that can be used in an application and service context aware cell selection process, according to some embodiments.

FIGS. 8A-8B illustrate exemplary aspects of possible cell filtering techniques that can be used in an application and service context aware cell selection process, according to some embodiments. In particular, in the scenario of FIG. 8A, in which cell ciphering configuration is used to filter out cells that do not meet the cell ciphering criteria for a wireless device, cells A, C, and D meet the criteria, while cells B and E do not meet the criteria. In contrast, in the scenario of FIG. 8B, a wireless device in the same location that uses power impacting configuration to filter out cells that do not meet power friendly criteria for a wireless device, cells C, D, and E meet the criteria, while cells A and B do not meet the criteria. Thus, depending on wireless device context, different cells may be preferred in different scenarios. Note that it is also possible that a wireless device could have multiple cell configuration preference criteria relating to different cell configuration characteristics, in which case such filtering could be performed sequentially (e.g., to filter out cells B and E based on cell ciphering criteria, then to also filter out cell A based on power friendly criteria, leaving cells C and D as candidate cells for cell selection, as one possibility). Note also that other cell configuration preference criteria, in addition or alternatively to the cell configuration preference criteria illustrated in FIGS. 8A-8B, are also possible.

Figure 9:
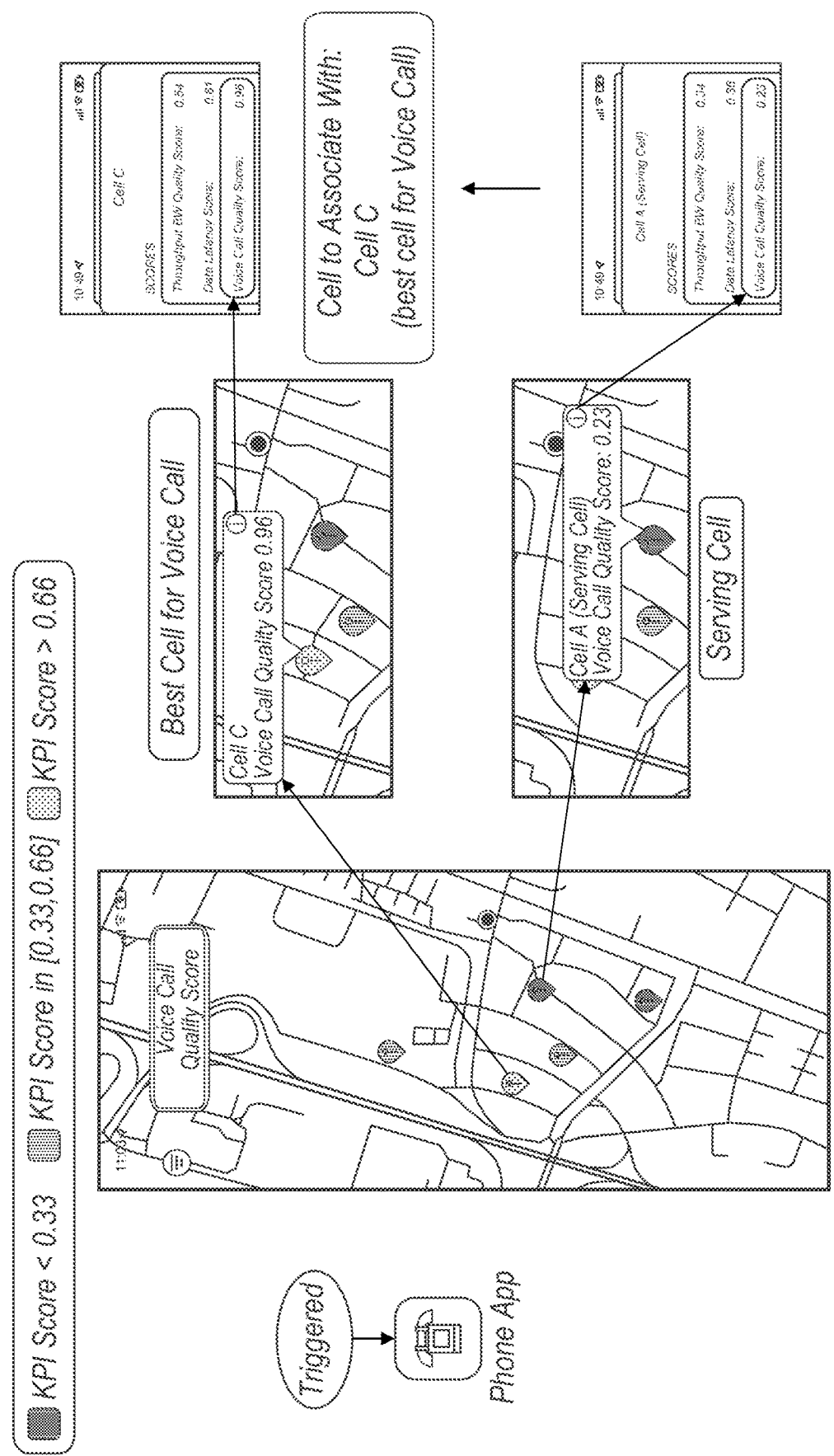
FIGS. 9-11 illustrate exemplary aspects of a possible cell selection process in which application and service context impacts cell selection, according to some embodiments.
Figure 10:
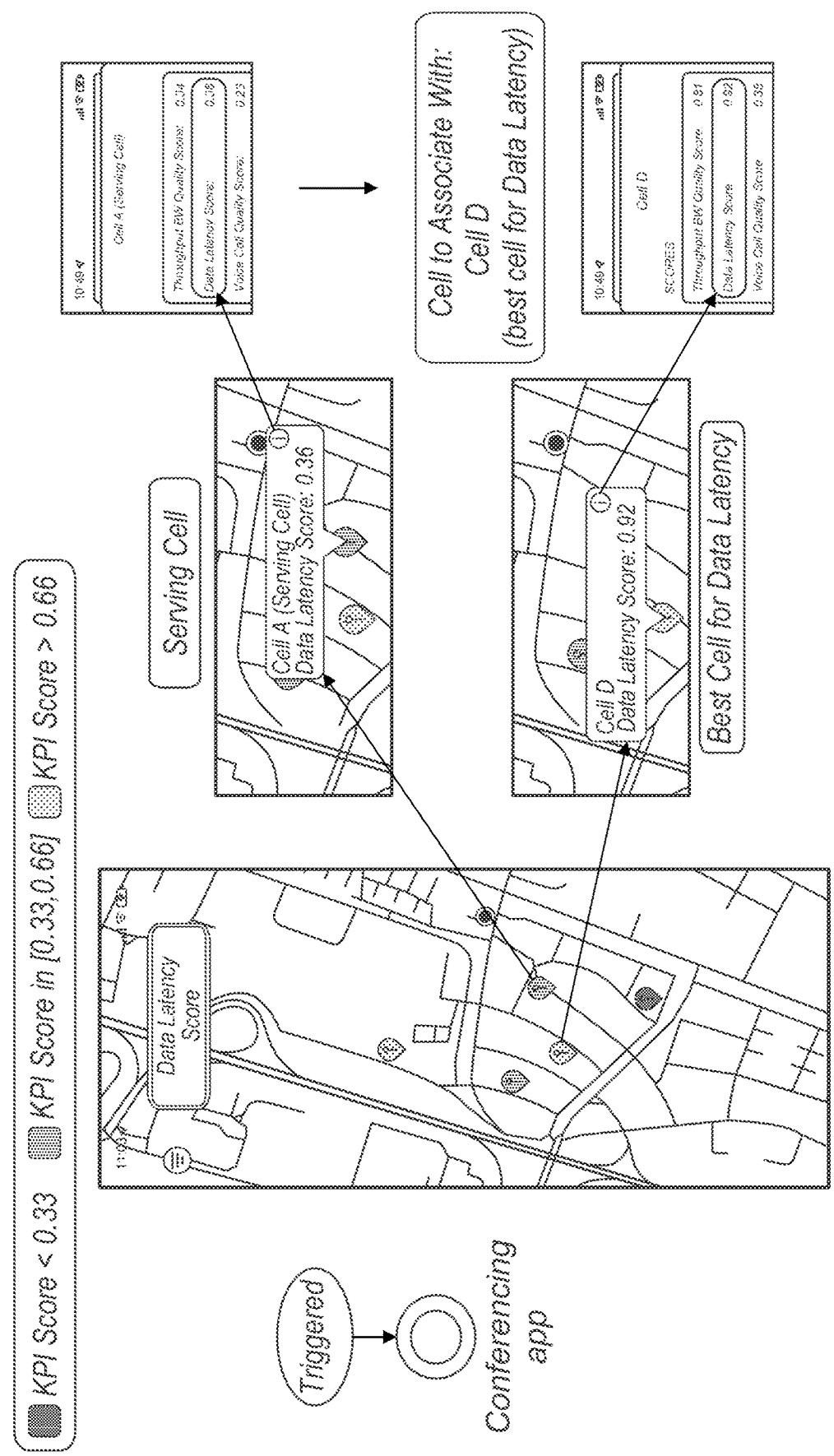
Figure 11:
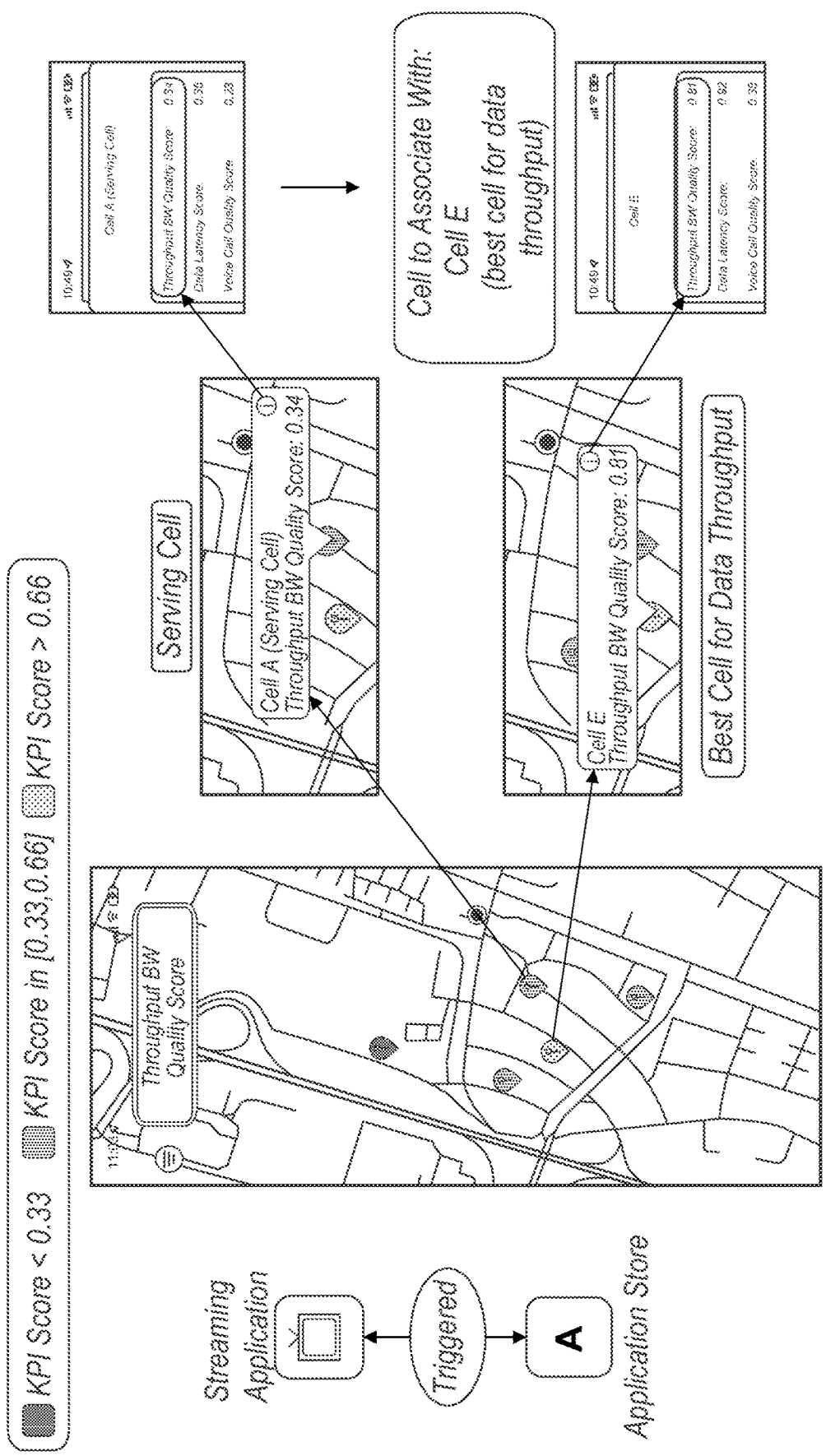

FIGS. 9-11 illustrate exemplary aspects of a possible cell selection process in which application and service context impacts cell selection, according to some embodiments. In particular, FIG. 9 illustrates aspects of a scenario in which cell selection preference is based at least in part on voice call quality scores for cells in the vicinity of a wireless device, FIG. 10 illustrates aspects of a scenario in which cell selection preference is based at least in part on latency scores for cells in the vicinity of a wireless device, and FIG. 11 illustrates aspects of a scenario in which cell selection preference is based at least in part on throughput scores for cells in the vicinity of a wireless device.

As shown, in the scenario of FIG. 9, baseband circuitry of a wireless device may receive a service request (e.g., from an application processor of the wireless device), which may be triggered by a voice call (e.g., phone) application. The baseband circuitry may perform cell selection to determine a cell on which to attempt to establish a radio resource control (RRC) connection for the service request. The cell selection may compare the voice call quality scores for cells in the vicinity of the wireless device, determine that cell C has a better voice call quality score than the current serving cell (cell A), and may accordingly determine to instead associate with cell C, e.g., in order to establish the RRC connection on a cell that is likely to provide better voice call quality.

In the scenario of FIG. 10, baseband circuitry of a wireless device may receive a service request, which may be triggered by a conferencing application. The baseband circuitry may perform cell selection to determine a cell on which to attempt to establish a RRC connection for the service request. At least in some instances, low latency may be considered a high priority for the conferencing application, and so the cell selection may compare the latency scores for cells in the vicinity of the wireless device. Based on the comparison, the wireless device may determine that cell D has a better data latency score than the current serving cell (cell A), and may accordingly determine to instead associate with cell D, e.g., in order to establish the RRC connection on a cell that is likely to provide better data latency.

In the scenario of FIG. 11, baseband circuitry of a wireless device may receive a service request, which may be triggered by a streaming (e.g., TV) application, an application store application, or another application for which throughput may be considered a high priority. The baseband circuitry may perform cell selection to determine a cell on which to attempt to establish a RRC connection for the service request. The cell selection may compare the throughput scores for cells in the vicinity of the wireless device. Based on the comparison, the wireless device may determine that cell E has a better throughput score than the current serving cell (cell A), and may accordingly determine to instead associate with cell E, e.g., in order to establish the RRC connection on a cell that is likely to provide better throughput.

Thus, depending on the application that triggers a service request and/or the type of service request, a wireless device may be able to choose a cell with which to associate that is expected to provide the best link for the triggering application/service type.

The cell information used may include any of a variety of possible scores, rates, flags, and/or other indicators, which may be based on any of a variety of possible performance metrics. FIG. 12 is a table illustrating one such set of possible scores, rates, flags, etc., that can be used as a basis for at least some of the techniques described herein. Note that the illustrated set of scores, rates, and flags are provided as examples of some such possible indicators, and that numerous other possible indicators and/or numerous variations on the provided example indicators are also possible.

As shown, one possible indicator may include a radio access technology (RAT) type for a cell, for example among NR standalone (SA), NR non standalone (NSA), LTE, etc.

One possible rate may include a cell accessibility and retainability rate. The cell accessibility portion of the rate may contribute a certain weight (e.g., 50%) to the overall rate, and may be based on how often random access channel (RACH) procedure failures occur on a cell. The cell retainability portion of the rate may be based on how often radio link failures occur on a cell and how often additional cell addition (e.g., through carrier aggregation (CA) or dual connectivity (DC)) failures occur on a cell, each of which may also contribute a certain weight (e.g., 25%) to the overall rate. At least in some embodiments, a lower accessibility and retainability failure rate may be better. Another possible rate may include a cell level stability rate. Such a rate may be based on how often data link stalls occur on a cell, and how often device resets occur on a cell, with each such contributing consideration being weighted (e.g, at 50% each, as one possibility) in its contribution to the overall rate. At least in some embodiments, a lower cell stability failure rate may be better.

Possible cellular link feature flags could include a power consumption configuration flag, a ciphering flag, a VoPS flag, and/or a coex flag, among various possibilities. The power consumption configuration flag could be based on whether the cell configuration includes connected discontinuous reception (CDRX) enablement, e.g., indicating that the cell configuration allows UEs to sleep for power saving purposes. The ciphering flag could be based on whether the cell configuration includes ciphering enablement, e.g., indicating that the cell configuration allows UEs to have secure and privacy preserving links with the cellular network. The VoPS flag could be based on whether the cell is VoPS (e.g., VoLTE and/or VoNR) capable, e.g., indicating that the cell configuration allows UEs to perform VoPS calls via the cell. The Coex flag may be based on whether a cell operates in a spectrum portion that may be subject to coexistence considerations (e.g., which may impact cell selection depending on coexistence context for the UE) with other wireless communication technologies. Note that such information may be valuable to UE baseband operation, for example to support properly instantiating the needed software and hardware resources upfront and in a timely manner, to cope with the inference and/or link drop issues that could potentially result from such coexistence. Cellular link feature flags could also be provided in relation to any of various other possible cell characteristics, as desired.

One possible application/service aware cell score could include a cell throughput bandwidth estimate. Such a score may be based on various throughput profile characteristics of a cell. For example, each of the DL throughput average, DL throughput 90th percentile, DL throughput 10th percentile, UL throughput average, UL throughput 90th percentile, and UL throughput 10th percentile values may be weighted in various proportions (e.g., 18%, 9%, 23%, 18%, 9%, and 23%, respectively, as one possibility) to quantify the size of the cellular throughput bandwidth of the link with the cell. At least in some embodiments, a higher throughput bandwidth quality score may be considered better.

Another possible application/service aware cell score could include a cell latency estimate. Such a score may be based on various latency characteristics of a cell. For example, each of the latency average, latency 90th percentile, and latency 10th percentile may be weighted in various proportions (e.g., 44%, 23%, and 33%, respectively, as one possibility) to quantify the degree to which the cellular link is considered latency friendly. At least in some embodiments, a higher latency quality score may be considered better.

Yet another possible application/service aware cell score could include a voice call quality score. Such a score may be based on voice call quality characteristics of a cell. For example, each of the VoPS call drop rate and the VoPS call setup success rate may be weighted in various proportions (e.g., 54.55% and 45.45%, respectively, as one possibility) to quantify the quality of the cellular link when used to perform voice calls. At least in some embodiments, a higher voice call quality score may be considered better.

Note that for at least some types of cell information (e.g., certain KPIs), devices may need to be in connected mode and go through a potentially time and resource consuming measurement and control information reception process to be able to obtain estimates for these values. Accordingly, there may be significant potential benefit from utilizing crowdsourced information from a relatively large number of devices to derive these values, e.g., in order to potentially obtain a relatively large sample size and relatively high accuracy/precision of the derived values, possibly with minimal or no additional sample collection burden on any given individual device beyond the scope of its ordinary operating activity, at least in some instances.

In some embodiments, at least some cell performance information may be calculated on a per cell strength/quality region basis. For example, different RSRP/SINR regions (or per cell heat-maps) even within the same cell may be defined, and different accessibility and retainability failure rates, stability failure rates, throughput bandwidth scores, latency scores, and/or voice call quality scores may be calculated for a cell for each such region. These regions or heat maps can also be estimated using crowdsourced measurement data, at least according to some embodiments. In some instances, such regions may be relatively dynamic (e.g., may change at various times, based on a device's velocity, cell instanteous load, etc.), and may potentially be updated as new/updated crowdsourced data becomes available. In a typical multi-cell scenario, to pick a cell to associate to, a device may accordingly measure the instantaneous actual RSRP/SINR values per cell and then may compare those to the per cell region thresholds (e.g., derived based on crowdsourced data), to decide in which RSRP/SINR region each cell belongs. Thus, when determining suitability for cell selection, the cell scores/rates/flags used may be specific to the RSRP/SINR region observed by the wireless device performing the cell selection.

FIG. 13 illustrates exemplary aspects of such a possible set of cell information that includes at least some different values for different RSRP/SINR regions, according to some embodiments. As shown, in the illustrated scenario, three RSRP/SINR regions may be defined for a cell provided by a cell tower. The RSRP/SINR regions may be defined by certain threshold RSRP and/or SINR values that differentiate the regions from each other, at least as one possibility. These threshold values may be configured as desired; for the purposes of clarity in explanation, the different regions may simply be referred to herein as a "good" region, a "moderate" region, and a "bad" region. Note that different numbers of RSRP/SINR regions may be used, if desired. As shown, in the illustrated scenario, the accessibility and retainability failure rates, stability failure rates, and throughput bandwidth scores are different in each different RSRP/SINR region, while the latency scores are consistent in all three regions, and the voice call quality scores are consistent in the good and moderate RSRP/SINR regions but different in the bad RSRP/SINR region. Note also that at least some cell characteristics may not be dependent on the RSRP/SINR region, and as such may not be calculated differently for different RSRP/SINR regions. For example, in the illustrated scenario, the network, cell identifier, cell location (coordinates), RAT, ciphering flag, power friendly flag, VoPS flag, and coexistence flag may be consistent across all RSRP/SINR regions.

Figure 14:
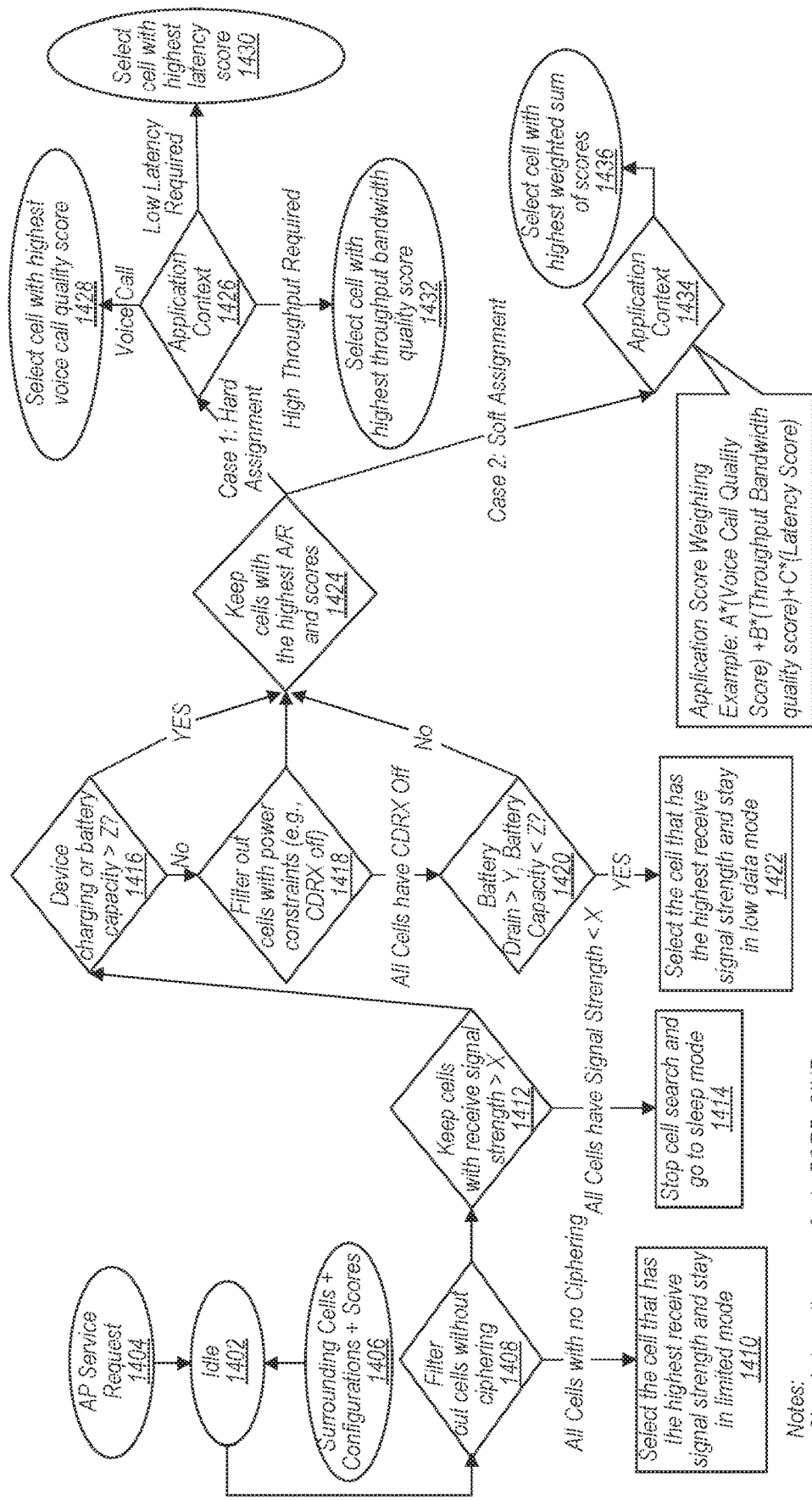
FIG. 14 is a flowchart diagram illustrating exemplary aspects of a possible cell selection process that considers application and service context, according to some embodiments.

FIG. 14 is a flowchart diagram illustrating exemplary aspects of a possible cell selection process that considers application and service context, according to some embodiments. In the illustrated scenario, in 1402, a wireless device may be in RRC idle mode with respect to cellular operation. In 1404, a service request may be received from an application processor of the wireless device, and in 1406, cell information for surrounding cells, including cell configuration information and any available cell scores/rates/flags/etc. for those cells may be obtained by cellular baseband circuitry of the wireless device. In 1408, any cell without ciphering may be filtered out from the cell selection process. If all available cells have no ciphering, in 1410, the cell that has the highest receive signal strength and/or quality may be selected and the wireless device may operate in a limited service mode, e.g., to limit potential privacy infringement from the lack of cell ciphering.

If at least some cells remain after filtering out any cells with no ciphering, in 1412, cells with receive signal strength and/or quality (e.g., RSRP+SINR) below a configured threshold ("X") may be filtered out from the cell selection process. If all remaining available cells have signal strength/quality below the configured threshold, in 1414, the cell search may be stopped and the wireless device baseband operations may enter a sleep mode.

If at least some cells remain after filtering out any cells with receive signal strength and/or quality below the configured threshold, one or more checks on the battery/power consumption status of the wireless device may be performed. In 1416, it may be determined whether the wireless device is charging (e.g., is connected to an external power source) or has battery capacity/reserves above a configured threshold ("Z"). If not, in 1418, cells with certain power constraints (e.g., CDRX off, or otherwise flagged as not power consumption friendly) may be filtered out from the cell selection process. If the wireless device is not charging, does not have battery capacity/reserves above the configured threshold, and all remaining cells have power constraints (e.g., CDRX off, or otherwise flagged as not power consumption friendly), in 1420, a further check whether current battery drain is above a configured threshold rate ("Y") and battery capacity/reserves are below the configured threshold Z. If so, in 1422, the cell with the highest receive signal and/or quality may be selected and the wireless device may operate in a low data mode, e.g., to limit further battery reserve drain.

If the wireless device is charging, or has battery capacity/reserves above the configured threshold Z, or at least some cells remain after filtering out cells with power constraints, or current battery drain is not above the configured threshold rate Y, in 1424, further filtering based on accessibility/retainability (A/R), stability, and/or application/service aware scores may be performed. Such filtering may include keeping up to a certain number of cells with the best A/R, stability, and application/service aware scores while discarding any other cells from the cell selection process, filtering out cells with the A/R, stability, and application/service aware scores that do not meet one or more configured threshold requirements, and/or any of various other filtering approaches.

After such filtering, there may be multiple possible approaches to performing application context aware cell selection, including a first case and a second case. In the first case, hard application context assignment may be performed, and the cell selection process may proceed from step 1424 to step 1426. In 1426, it may be determined whether the application context for the current service request is a voice call context, a low latency requirement context, or a high throughput required context. If the current service request is a voice call context, in 1428, the remaining cell with the highest voice call quality score may be selected. If the current service request is a low latency requirement context, in 1430, the remaining cell with the highest latency score may be selected. If the current service request is a high throughput required context, in 1432, the remaining cell with the highest throughput bandwidth quality score may be selected.

As an alternative, in the second case, soft application context assignment may be performed, and the cell selection process may proceed from step 1424 to step 1434. In 1434, the application context may be determined using an application score weighting approach, in which weights may be applied to each of the voice call quality score, the throughput bandwidth quality score, and the latency score for each cell in accordance with the relative importance of each score to the application or service type associated with the service request. Note that if desired, A/R and/or stability rates can also be included in the weighted sum with their own combined or individual weighting factors. In 1436, the remaining cell with the highest weighted sum of scores may be selected. Note that at least in some embodiments, the weights may be configured such that the sum of the weights adds to 100% (e.g., A+B+C=100%, in the illustrated scenario of FIG. 14). As previously noted herein, the scores and rates used in the cell selection may depend on the measured RSRP/SINR for each cell under consideration, at least in some embodiments.

It should be noted that, additionally or alternatively to using detailed cell performance and configuration information for application/service/device context aware cell selection, such information can be used for any of various other purposes. As one such possibility, the baseband resource controller (e.g., the access tratum radio resource controller (AS-RRC) of a wireless device may use derived cell scores, rates, and flags, in conjunction with the device's geo-location and velocity estimates, to determine when the device is approaching locations with potentially problematic cellular behavior (e.g., tunnels, known areas with bad coverage, etc., for which score/rate values may provide an indication) and act proactively to avoid dropping the cellular link and/or recovering cellular service more quickly if dropping the cellular link cannot be avoided.

Such AS-RRC proactive actions could include increasing the rate at which cellular measurements are performed, e.g., to increase the chance of finding a good cell to move to, in case the serving cell conditions are degrading and scores/rates of nearby cells are as good or better than the current serving cell. Another possible action could include triggering single shot measurements on a given frequency before trying to reselect or be handed over to its corresponding cell. This may help make the cell association process more robust against noisy measurements that result in a "ghost cell" effect, where a device detects a cell when there is actually no real cell, thus helping to reduce or avoid the possibility of re-selection/handover ping-pong scenarios. Yet another possible action could include applying some general or cell specific offsets for the re-selection/handover criteria depending on the scores, to fulfill QoS application needs when scores of surrounding cells are as good as or better than the serving cell score. Still another possible action could include determining not to reselect to a cell if it does not support certain features, such as if VoPS is not supported and the AP side service request is triggered by a voice application. Such action may prevent the device from needing to perform a potentially time and resource consuming evolved packet service (EPS) fallback before establishing the voice call, which could affect the overall end user perceived call quality. Note that any of various other such proactive actions (e.g., performed by the AS-RRC and/or other device entities) based on cell performance and configuration information, device geo-location, device velocity, and/or other considerations are also possible.

In the following further exemplary embodiments are provided.

One set of embodiments may include an apparatus, comprising: a processor configured to cause a wireless device to: determine a current location of the wireless device; determine one or more cells associated with the current location of the wireless device; determine application context based metric information for the one or more cells associated with the current location of the wireless device; and determine a cell with which to associate from the one or more cells associated with the current location of the wireless device based at least in part on the application context based metric information for the one or more cells associated with the current location of the wireless device.

According to some embodiments, the application context based metric information for the one or more cells associated with the current location of the wireless device is determined based at least in part on one or more of aggregated crowdsourced data or historical cell performance measurements performed by the wireless device.

According to some embodiments, the processor is further configured to cause the wireless device to: receive a service request from an application executing on the wireless device; and determine an application type of the application from which the service request is received, wherein the cell with which to associate is determined further based at least in part on the application type of the application from which the service request is received.

According to some embodiments, the application context based metric information for the one or more cells associated with the current location of the wireless device is determined based at least in part on one or more signal strength measurements or signal quality measurements for the one or more cells associated with the current location of the wireless device.

According to some embodiments, the processor is further configured to cause the wireless device to: determine one or more cell characteristics or expected cell performance information for the one or more cells associated with the current location of the wireless device based at least in part on one or more of aggregated crowdsourced data or historical cell performance measurements performed by the wireless device.

According to some embodiments, the one or more cell characteristics or expected cell performance information include information for one or more of: a power consumption configuration metric; a ciphering support metric; a voice over packet switched (VoPS) support metric; a cell accessibility metric; a cell retainability metric; or a cell stability metric.

According to some embodiments, the application context based metric information includes information for one or more of: a cell throughput metric; a cell latency metric; or a cell voice call quality metric.

Another set of embodiments may include a wireless device, comprising: an antenna; a radio operably coupled to the antenna; and a processor operably coupled to the radio; wherein the wireless device is configured to: determine a current location of the wireless device; determine one or more cells associated with the current location of the wireless device; determine cell performance information for one or more application context based metrics for each of the one or more cells associated with the current location of the wireless device; and determine a cell with which to associate from the one or more cells associated with the current location of the wireless device based at least in part on the cell performance information for the one or more application context based metrics for each of the one or more cells associated with the current location of the wireless device.

According to some embodiments, the cell performance information for at least one cell of the one or more cells associated with the current location of the wireless device is determined based at least in part on historical cell performance between the wireless device and the at least one cell.

According to some embodiments, the cell performance information for at least one cell of the one or more cells associated with the current location of the wireless device is determined based at least in part on aggregated crowd-sourced data.

According to some embodiments, the wireless device is further configured to: receive aggregated crowdsourced data indicating cell performance information for the one or more application context based metrics for a plurality of cells, wherein the plurality of cells include the at least one cell of the one or more cells associated with the current location of the wireless device.

According to some embodiments, the cell performance information for the one or more application context based metrics for each of the one or more cells associated with the current location of the wireless device is determined based at least in part on one or more signal strength measurements or signal quality measurements for each of the one or more cells associated with the current location of the wireless device.

According to some embodiments, the one or more application context based metrics include one or more of: a cell throughput metric; a cell latency metric; or a cell voice call quality metric.

Yet another set of embodiments may include a method, comprising: by a wireless device: determining a current location of the wireless device; determining one or more cells associated with the current location of the wireless device; determining one or more cell characteristics for the one or more cells associated with the current location of the wireless device based at least in part on aggregated crowd-sourced data for the one or more cells associated with the current location of the wireless device, wherein the one or more cell characteristics for the one or more cells associated with the current location of the wireless device include at least one application context based metric; and determining a cell with which to associate from the one or more cells associated with the current location of the wireless device based at least in part on the one or more cell characteristics for the one or more cells associated with the current location of the wireless device.

According to some embodiments, determining the cell with which to associate from the one or more cells associated with the current location of the wireless device is further based at least in part on one or more wireless device context characteristics for the wireless device.

According to some embodiments, the one or more wireless device context characteristics include one or more of: whether the wireless device is currently charging; a current battery reserve level of the wireless device; a current power consumption mode of the wireless device; or a current battery drain rate of the wireless device.

According to some embodiments, determining the cell with which to associate from the one or more cells associated with the current location of the wireless device is further based at least in part on application context information for the wireless device.

According to some embodiments, the application context information for the wireless device includes prioritization information for one or more of throughput, latency, or voice call quality for one or more applications active at the wireless device.

According to some embodiments, at least a subset of the one or more cell characteristics for the one or more cells associated with the current location of the wireless device are determined based at least in part on one or more signal strength measurements or signal quality measurements for the one or more cells associated with the current location of the wireless device.

According to some embodiments, the one or more cell characteristics include one or more of: a cell accessibility metric; a cell retainability metric; a cell stability metric; a power consumption configuration metric; a ciphering support metric; a voice over packet switched (VoPS) support metric; a cell throughput metric; a cell latency metric; or a cell voice call quality metric.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
determine a current location of the wireless device;
select, based on execution of an application on the wireless device, an application context related cell characteristic to prioritize for selection of a target cell with which to connect;
determine a first cell and a second cell associated with the current location of the wireless device;
determine respective values of the application context related cell characteristic for the first cell and the second cell associated with the current location of the wireless device;
select the target cell with which to connect from the first cell or the second cell based at least in part on the respective values of the application context related cell characteristic for the first cell and the second cell associated with the current location of the wireless device; and
connect to a cellular network using the target cell.

2. The apparatus of claim 1,
wherein the respective values of the application context related cell characteristic for the first cell and the second cell associated with the current location of the wireless device are determined based at least in part on one or more of aggregated crowdsourced data or historical cell performance measurements performed by the wireless device.

3. The apparatus of claim 1, wherein the processor is further configured to cause the wireless device to:
receive a service request from the application; and
determine an application type of the application,
wherein the target cell is selected further based at least in part on the application type of the application.

4. The apparatus of claim 1,
wherein the respective values of the application context related cell characteristic for the first cell and the second cell associated with the current location of the wireless device are determined based at least in part on one or more signal strength measurements or signal quality measurements for the first cell and the second cell associated with the current location of the wireless device.

5. The apparatus of claim 1, wherein the processor is further configured to cause the wireless device to:
determine expected cell performance information for the first cell and the second cell associated with the current location of the wireless device based at least in part on one or more of aggregated crowdsourced data or historical cell performance measurements performed by the wireless device.

6. The apparatus of claim 5, wherein the expected cell performance information include information for one or more of:
a power consumption configuration metric;
a ciphering support metric;
a voice over packet switched (VoPS) support metric;
a cell accessibility metric;
a cell retainability metric; or
a cell stability metric.

7. The apparatus of claim 1, wherein the respective values of the application context related cell characteristic include information for one or more of:
a cell throughput metric;
a cell latency metric; or
a cell voice call quality metric.

8. A wireless device, comprising:
a radio; and
a processor operably coupled to the radio and configured to cause the wireless device to:
determine a current location of the wireless device;
select, based on execution of an application on the wireless device, an application context related cell characteristic to prioritize for selection of a target cell with which to connect;
determine a first cell and a second cell associated with the current location of the wireless device;
determine respective values of the application context related cell characteristic for the first cell and the second cell associated with the current location of the wireless device;
select the target cell with which to connect from the first cell or the second cell based at least in part on the respective values of the application context related cell characteristic for the first cell and the second cell associated with the current location of the wireless device; and
connect to a cellular network using the target cell.

9. The wireless device of claim 8,
wherein the respective values of the application context related cell characteristic for the first cell and the second cell associated with the current location of the wireless device are determined based at least in part on one or more of aggregated crowdsourced data or historical cell performance measurements performed by the wireless device.

10. The wireless device of claim 8,
wherein the processor is further configured to cause the wireless device to:
receive a service request from the application; and
determine an application type of the application,
wherein the target cell is selected further based at least in part on the application type of the application.

11. The wireless device of claim 8,
wherein the respective values of the application context related cell characteristic for the first cell and the second cell associated with the current location of the wireless device are determined based at least in part on one or more signal strength measurements or signal quality measurements for the first cell and the second cell associated with the current location of the wireless device.

12. The wireless device of claim 8, wherein the processor is further configured to cause the wireless device to:
determine one or more cell characteristics or expected cell performance information for the first cell and the second cell associated with the current location of the wireless device based at least in part on one or more of aggregated crowdsourced data or historical cell performance measurements performed by the wireless device.

13. The wireless device of claim 12, wherein the one or more cell characteristics or expected cell performance information include information for one or more of:
a power consumption configuration metric;
a ciphering support metric;
a voice over packet switched (VoPS) support metric;
a cell accessibility metric;
a cell retainability metric; or
a cell stability metric.

14. The wireless device of claim 8, wherein the respective values of the application context related cell characteristic includes information for one or more of:
a cell throughput metric;
a cell latency metric; or
a cell voice call quality metric.

15. A method, comprising:
determining a current location of a wireless device;
selecting, based on execution of an application on the wireless device, an application context related cell characteristic to prioritize for selection of a target cell with which to connect;
determining a first cell and a second cell associated with the current location of the wireless device;
determining respective values of the application context related cell characteristic for the first cell and the second cell associated with the current location of the wireless device;
selecting the target cell with which to connect from the first cell or the second cell based at least in part on the respective values of the application context related cell characteristic for the first cell and the second cell associated with the current location of the wireless device; and
connecting to a cellular network using the target cell.

16. The method of claim 15,
wherein the respective values of the application context related cell characteristic for the first cell and the second cell associated with the current location of the wireless device are determined based at least in part on one or more of aggregated crowdsourced data or historical cell performance measurements performed by the wireless device.

17. The method of claim 15, further comprising:
receiving a service request from the application; and
determining an application type of the application,
wherein the target cell is selected further based at least in part on the application type of the application.

18. The method of claim 15,
wherein the respective values of the application context related cell characteristic for the first cell and the second cell associated with the current location of the wireless device are determined based at least in part on one or more signal strength measurements or signal quality measurements for the first cell and the second cell associated with the current location of the wireless device.

19. The method of claim 15, further comprising:
determining one or more cell characteristics or expected cell performance information for the first cell and the second cell associated with the current location of the wireless device based at least in part on one or more of aggregated crowdsourced data or historical cell performance measurements performed by the wireless device.

20. The method of claim 15, wherein the respective values of the application context related cell characteristic includes information for one or more of:
a cell throughput metric;
a cell latency metric; or
a cell voice call quality metric.

* * * * *